UNITED STATES PATENT OFFICE.

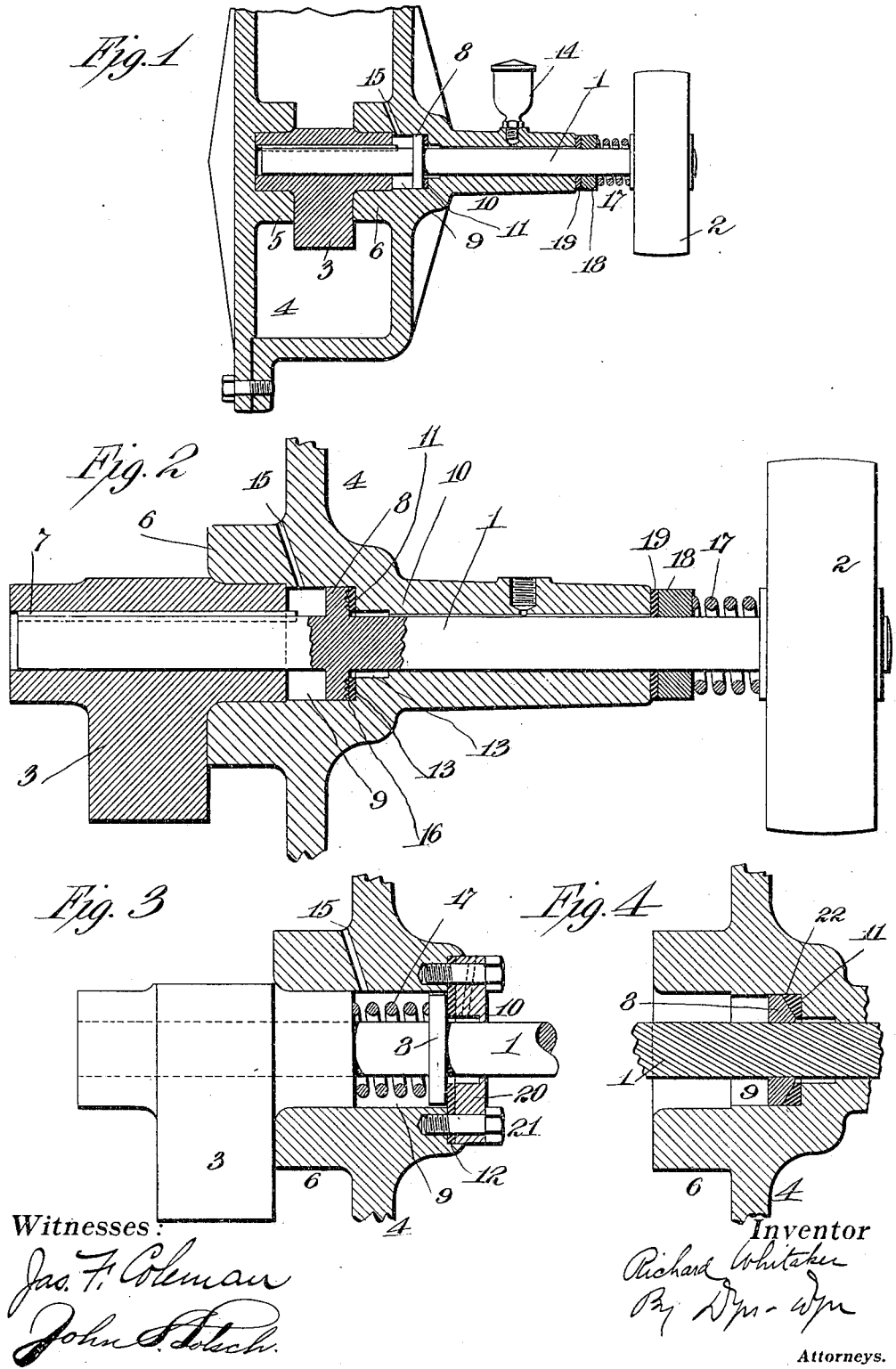

RICHARD WHITAKER, OF NEW BRUNSWICK, NEW JERSEY, ASSIGNOR OF TWO-THIRDS TO ROBERT W. JOHNSON AND JAMES W. JOHNSON, OF NEW BRUNSWICK, NEW JERSEY.

SHAFT-PACKING.

No. 807,981.　　　Specification of Letters Patent.　　　Patented Dec. 19, 1905.

Application filed December 2, 1904. Serial No. 235,210.

*To all whom it may concern:*

Be it known that I, RICHARD WHITAKER, a citizen of the United States, residing at New Brunswick, county of Middlesex, State of New Jersey, have invented certain new and useful Improvements in Shaft-Packing, of which the following is a specification.

The object I have in view is the production of a packing for shafts to be used in lieu of a stuffing-box for certain types of mechanism in which a rotary or oscillating shaft extends through the walls of a chamber in which liquids or gases are confined under pressure and which will prevent leakage and may be readily inspected and the parts removed.

Another object is the production of a packing which will make a joint of perfect tightness irrespective of the pressure to which it is subjected and which may be used to prevent leakage in the opposite direction—as, for instance, in a pump working against a vacuum.

I attain these objects by the mechanism illustrated in the accompanying drawings, in which—

Figure 1 is a sectional view of a pump embodying my improvements. Fig. 2 is an enlarged view of a portion thereof. Fig. 3 is a sectional view of a modification, and Fig. 4 is still another modification.

In all the views like parts are designated by the same reference characters.

The invention comprises a collar on the shaft, such collar being forced upon its seat by means of the confined liquid or gases, the shaft being capable of longitudinal movement to permit automatic adjustment.

The invention may be applied to any mechanism employing a rotary or oscillating shaft, such as pumps or reciprocating or rotary engines or turbines; but I show it in connection with a gas-pump to be used in a refrigerating apparatus of the compression type.

In carrying out my invention I provide a driving-shaft 1. As shown in Fig. 1, this shaft is provided with power-absorbing or movement-imparting means—in this instance the driving-pulley 2—and an eccentric 3, constituting a moving member to which the operating parts of the pump are connected. Instead of an eccentric it is obvious that cranks may be substituted, and instead of a pump being used it is equally obvious that the improvements may be applied to an engine.

The casing 4 is provided with bearings 5 and 6 for the moving member 3. The shaft 1 is connected with the member so as to rotate therewith and by means of a keyway and key 7 or equivalent device may have some longitudinal play.

The shaft 1 is provided with a collar 8, which may be integral, as shown in Fig. 1, or separate, as shown in Fig. 4; but if made separate it is tightly secured to the shaft, so that there will be no leakage between the two. This collar is located within a chamber 9 of larger diameter than the bearing 10 for the shaft 1, an offset or shoulder 11 connecting the two. This shoulder serves as a support for a washer 12, which is preferably made of softer material than the collar 8, hard fiber being preferred. The washer may be omitted, if desired, in which case the shoulder may be made of softer metal than the collar; but this is not essential. The shoulder alone or the shoulder and washer, when both are employed, constitute a seat against which the collar abuts. The portions of the bearing 10 adjacent to the shoulder 11 are enlarged at 13, so as to form a chamber for lubricant, which may be supplied from the oil-cup 14. The chamber 9 communicates with the interior of the casing either by leakage through the bearing 6 or through a port 15, formed for this purpose. In operation the pressure from the interior of the casing will be communicated to the chamber 9 and will force the collar 8, and with it the shaft 1, longitudinally within its bearings, causing the collar to engage with the washer 12 with a degree of pressure depending upon the pressure within the casing, but in all cases sufficient to prevent leakage between the shoulder and collar. It is obvious that the greater the pressure within the casing the closer will the collar be forced upon its seat, so that the joint will at all times be tight. The only joint will be between the bearing-face of the collar and the seat. As a further preventive of leakage and a means of reducing friction the bearing-face of the collar 8 is provided with numerous concentric grooves 16, which grooves preferably have sharp angular faces, as shown in Fig. 2. These grooves are engaged with the washer 12 and reduce the extent of surface which would otherwise cause friction. They also provide a series of annular concentric chambers which when the packing is employed in connection with a pump for compressing ammonia will serve as condensing-chambers in the event of any ammonia-gas leaking from one chamber to the other and will thereby serve as a liquid seal. In order to engage the collar with its bearing when the pressure within the casing 4 is insufficient—as an example, when pumping against a vacuum—a spring 17 may be employed for moving the shaft longitudinally. In Fig. 2 this spring is shown as located between the pulley 2 and a ring 18, surrounding the shaft 1, and engaging with the bearing 10 by means of a washer 19. In Fig. 3 the spring is located between the collar and the moving member 3. It is to be understood that the spring is not essential, as the packing will be tight under all circumstances without the spring, provided the pressure within the casing is sufficient to force the collar into close engagement with its seat.

In Figs. 1 and 2 the bearing 10 is extended so as to avoid the necessity of an additional bearing, as would be required in the structure shown in Fig. 3. In this latter structure the bearing 10 is formed within a plate 20, secured to the casing 4 by means of bolts 21, which permits ready inspection and separation of the parts.

In Fig. 4 the bearing-surfaces of the collar 8 are inclined at 22, the washer 11 being correspondingly shaped.

Having now described my invention, what I claim, and desire to secure by Letters Patent, is—

1. In a packing for rotary shafts, the combination with a member having a seat, of a shaft with a collar engaging with the seat, the shaft being capable of longitudinal movement to engage the collar with the seat, the bearing-face of the collar having sharp-faced grooves.

2. In a packing for rotary shafts, the combination with a member having a seat, of a shaft with a collar engaging with the seat, the shaft being capable of longitudinal movement to engage the collar with the seat, the bearing-face of the collar being concentrically grooved.

3. In a packing for rotary shafts, the combination with a member having a seat, of a shaft with a collar engaging with the seat, the shaft being capable of longitudinal movement to engage the collar with the seat, the bearing-face of the collar having sharp-faced grooves concentrically arranged.

4. The combination with a casing, a moving member therein, a shaft connected thereto and passing outside the casing, the shaft being connected to the moving member by means to allow of longitudinal movement, a collar upon the shaft, a seat upon the casing, the bearing-face of the collar being concentrically grooved, and a spring for forcing the collar against the seat.

5. The combination with a casing, a moving member therein, a shaft connected thereto and passing outside the casing, the shaft being connected to the moving member by means to allow of longitudinal movement, a collar upon the shaft, a seat upon the casing, the bearing-face of the collar being concentrically grooved, and a spring outside of the casing for forcing the collar against the seat.

6. In a packing for rotary shafts, the combination with a member having a shoulder, of a shaft with a collar engaging with the shoulder, the shaft being capable of longitudinal movement to engage the collar with the shoulder, the face of the collar being grooved, and a washer of soft material between the collar and the shoulder, the said washer being capable of being forced partially into the grooves in the shoulder.

7. In a packing for rotary shafts, the combination with a member having a shoulder, of a shaft with a collar engaging with the shoulder, the shaft being capable of longitudinal movement to engage the collar with the shoulder, the face of the collar having sharp-faced grooves, and a washer of soft material between the collar and the shoulder, the said washer being capable of being forced partially into the grooves in the shoulder.

8. In a packing for rotary shafts, the combination with a member having a shoulder, of a shaft with a collar engaging with the shoulder, the shaft being capable of longitudinal movement to engage the collar with the shoulder, the face of the collar having concentric grooves, and a washer of soft material between the collar and the shoulder.

9. In a packing for rotary shafts, the combination with a member having a shoulder, of a shaft with a collar engaging with the shoulder, the shaft being capable of longitudinal movement to engage the collar with the shoulder, the face of the said collar having sharp-faced concentric grooves.

This specification signed and witnessed this 28th day of November, 1904.

RICHARD WHITAKER.

Witnesses:
EDW. P. FOWLE,
GEO. F. MCCORMICK.